Feb. 4, 1969　　　O. FELLER ETAL　　　3,425,240
FLEXIBLE SHAFT COUPLING
Filed Dec. 21, 1966

Inventors
Otto FELLER & Paul VOSSIECK

By　*Spencer & Kaye*

Attorney

United States Patent Office 3,425,240
Patented Feb. 4, 1969

3,425,240
FLEXIBLE SHAFT COUPLING
Otto Feller and Paul Vossieck, Burscheid, Germany, assignors to Goetzewerke Friedrich Goetze AG, Burscheid, Germany
Filed Dec. 21, 1966, Ser. No. 603,489
Claims priority, application Germany, Jan. 13, 1966, G 45,699
U.S. Cl. 64—11          5 Claims
Int. Cl. F16d 3/16

ABSTRACT OF THE DISCLOSURE

A flexible shaft coupling is formed from a plurality of elastic springs connected together to form a polygonal ring, with a plurality of approximately spherical metallic coupling elements interposed betwen the springs and embedded in the elastic material for connecting the flexible shaft coupling to coupling plates.

Background of the invention

This invention relates to a flexible shaft coupling for motor vehicles and the like. Flexible couplings for the connection of nonaligned shafts are known which are provided with cushions or buffers made from rubber or other elastic material for the transfer of the power from one coupling element to another. In order to secure the rubber cushions tightly between the coupling plates, the rubber cushions generally are prestressed, which also increases their life-span. The coupling elements are connected to the end surfaces of the rubber cushions in a firmly bonded manner, for example by vulcanization, which produces a continuous polygonal ring. But if such couplings are to be used for relatively high angular deflections, the rubber cushions must be relatively long in the axial direction, which results in sharp bending of the rubber cushions in practical operation. It is known to remedy this drawback by providing metallic shells which surround the rubber cushions in a housing-like manner and thereby partially prevent the free expansion of the cushions.

It is furthermore known to design the rubber cushions with a generally column-like, straight line axis, whereby the rubber cushions are connected to the metal coupling elements by vulcanization. The end surfaces of the rubber cushions or the metal coupling elements are arranged in planes which intercept each other substantially in the coupling axis, in order to stress the individual rubber cushions at right angles to their longitudinal axis and to thereby prevent a sharp bending of the cushions. Although the rubber cushions are pressure prestressed and have an average length which exceeds the average diameter of the cushion, this does not produce any disadvantageous consequences. On the contrary, it improves the life-span of the coupling. Such flexible couplings have proved to be of value in the motor vehicle industry.

In another arrangement the shaft coupling is further improved in that the connection surfaces of the metallic coupling elements, which are, for example, designed as adapter sleeves, are provided with bulge-like or wart-like protrusions which are positioned approximately in the direction of the rubber spring axis and are entirely surrounded by the material of the rubber spring. This increases the life-span of the rubber cushions and thereby the life-span of the shaft coupling, but it also increases the cost of the metallic coupling elements.

Summary of the invention

It is the object of this invention to improve the metallic coupling elements interposed between the rubber cushions and the shaft coupling, and more specifically to reduce their manufacturing costs and provide a better distribution of stress in the shaft coupling.

This problem is solved, according to the invention, by forming the metallic coupling elements in the form of a ball or a ball-like body. The production of balls or approximately spherical metal parts is considerably simpler and cheaper than that of the adapter sleeves which have been used heretofore, which adapter sleeves comprise, as is known, two half-shells which are riveted together. Furthermore, due to the approximately spherical form of the metal coupling elements, the edge stresses in the rubber cushions having a substantially circular cross section are considerably reduced, so that loosening of the rubber cushions from the metal parts is eliminated even when the shaft coupling is under extreme stresses. In the case of rubber cushions which have a cross section other than circular, for example elliptical or rectangular, the metal coupling elements should have a spherical shape which is adapted to the cross section of the rubber cushion.

For a better installation and mounting of the spheres to the corresponding shaft flanges, this invention further provides that the spheres have approximately cylindrical shoulders at two oppositely positioned places. If the shaft coupling is connected to the shaft flanges by screws or rivets, borings are provided through the cylindrical shoulders or the sphere and the spheres themselves to receive the screws or rivets.

In a further development of the invention, recesses are provided directed toward the sphere center in the region of the junction with the rubber cushions, in order to increase the adhesion of the rubber cushions with respect to the metal coupling element. Finally, protrusions in the form of ribs or the like are provided on the surface of the sphere for aligning the metal parts in the vulcanization molds.

Description of the preferred embodiments

Figure 1:
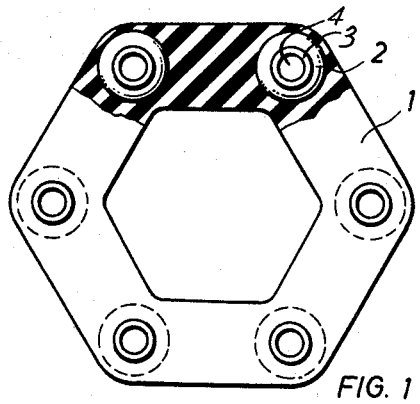
FIGURE 1 is a plan view of a flexible shaft coupling which includes six rubber cushions with interposed metal coupling elements.

The shaft coupling shown in FIGURE 1 includes six rubber cushions 1 which are arranged to form a polygonal ring having interposed therein between six metal coupling elements 2. In this embodiment, the rubber cushions 1 have a circular cross section, but the present invention is not limited to this particular cross section. The metal coupling elements 2 are spheres which are provided with cylindrical shoulders 3 at two oppositely positioned places. Borings 4 are provided through the shoulders 3 and through the spheres to receive screws, rivets, or the like, when the shaft is mounted.

Figure 2:
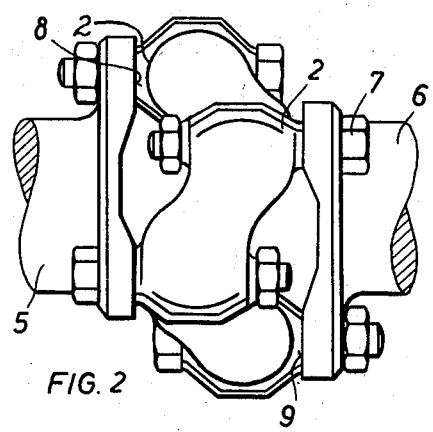
FIGURE 2 is a side elevational view of the shaft coupling of FIGURE 1 installed between two shaft flanges and axially braced.
Figure 3:
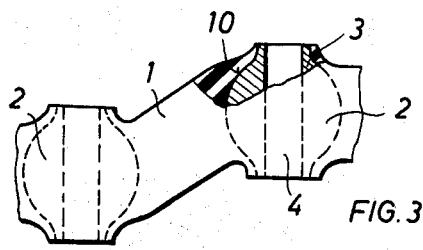
FIGURE 3 is an end elevation view showing two metal coupling elements of the axially braced shaft coupling of FIGURE 2.

FIGURE 2 shows a shaft coupling installed between two shaft flanges 5 and 6. The metal coupling elements 2 are alternatively connected to the shaft flanges 5 and 6 via machine screws 7. If the distance between the two end surfaces 8 and 9 of the shaft flanges 5 and 6 is substantially greater than the maximum height of the metal coupling elements 2, the rubber cushions are heavily deformed. FIGURE 3 shows such a braced rubber cushion 1 between the associated metal coupling elements 2. Due to the spherical form 10 of the metal coupling element 2, a uniform stress distribution in the rubber cushion 1 is obtained. At the same time, the adhesion between the rubber cushion 1 and metal coupling element 2 is increased due to the increased surface contact area.

Figure 4:
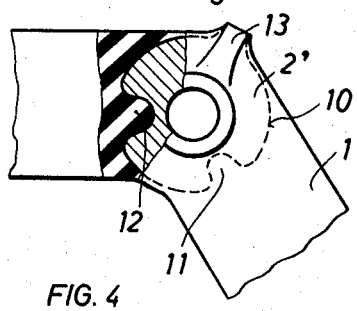
FIGURE 4 is a detail plan view of a metal coupling element having rubber cushions vulcanized thereto at both sides.

For a further improvement of the adhesion between the rubber cushion 1 and metal coupling element 2, recesses 11 are provided in the spherical surface 10 (FIGURE 4), into which recesses the rubber cushions extend in plug-shaped extensions 12. The recesses 11 are provided approximately in the middle of the connection surface of the rubber cushions 1 and extend toward the center of metal coupling elements 2'. The metal coupling elements 2' are furthermore provided with ribs 13, which serve for centering the spheres 2' in the injection mold during the production of the coupling.

Figure 5:
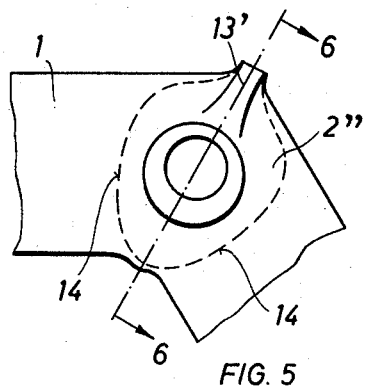
FIGURE 5 is a detail plan view of another metal coupling element have rubber cushions vulcanized thereto at both sides.
Figure 6:
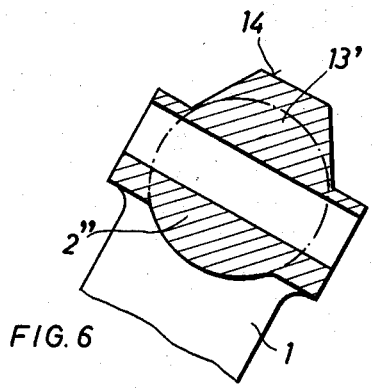
FIGURE 6 is a cross-sectional view taken substantially on the plane defined by reference lines 6—6 in FIGURE 5.

In the embodiments according to FIGURES 5 and 6, the metal coupling element 2" is substantially a sphere which is, however, slightly flattened in the region of the connection surface 14, especially in the region of the middle zone of the rubber cushion 1. The rib 13' is designed to have a trapezoidal shape in its longitudinal direction, so that its outer contour 14 is an at least approximately planar surface. If a shaft coupling according to the invention is prestressed to a predetermined nominal diameter, this is often done by putting a strap (not shown) around the outer periphery of the polygonal coupling body. In such a case, the strap rests on the surfaces 14 of the ribs 13'.

It will be apparent from the foregoing description that this invention serves to reduce the cost of manufacturing the above-noted metallic coupling elements and also to produce a more favorable stress distribution at the junction between the elastic spring and metallic coupling element. This permits higher moments of rotation to be transferred through the flexible shaft coupling of this invention without danger of shearing at the junction of the elastic spring and the metallic coupling element, even when the shafts carrying the coupling are considerably out of alignment.

It will be understood that the above description of the present invention is susceptible to various modifications, changes, and adaptations, and the same are intended to be comprehended within the meaning and range of equivalents of the appended claims.

We claim:
1. A flexible shaft coupling for coupling two coupling plates, comprising, in combination:
   a plurality of column-like springs made from an elastic material and connected together to form a polygonal ring, and
   a plurality of metallic coupling elements interposed between said springs and embedded in the elastic material thereof for connecting the flexible shaft coupling to said two coupling plates, each of said metallic coupling elements being approximately spherical in shape.

2. A flexible shaft coupling as defined in claim 1 and also including a pair of approximately cylindrical shoulders extending from opposite sides of each metallic coupling element.

3. A flexible shaft coupling as defined in claim 2 and also including a bore formed in each of said metallic coupling elements and extending through said cylindrical shoulders thereof.

4. A flexible shaft coupling as defined in claim 3 and also including recesses formed in said metallic coupling elements at the junction of the metallic coupling element and the adjacent column-like springs.

5. A flexible shaft coupling as defined in claim 4 and also including ribs projecting from said metallic coupling elements.

References Cited

UNITED STATES PATENTS

| 2,982,118 | 5/1961 | Franceschetti et al. | 64—13 |
| 3,099,879 | 8/1963 | Horovitz | 64—11 X |
| 3,112,626 | 12/1963 | Barone | 64—11 |

FOREIGN PATENTS 493,794  10/1938  Great Britain.

HALL C. COE, *Primary Examiner.*